United States Patent [19]
Bulusu et al.

[11] Patent Number: 6,065,011
[45] Date of Patent: May 16, 2000

[54] SYSTEM AND METHOD FOR MANIPULATING A CATEGORIZED DATA SET

[75] Inventors: Krishna Mohan Bulusu; Neelamadhaba Mahapatro, both of Redmond, Wash.

[73] Assignee: Microsoft Corporation, Redmond, Wash.

[21] Appl. No.: 08/822,356

[22] Filed: Mar. 20, 1997

[51] Int. Cl.[7] ............................................ G06F 17/30
[52] U.S. Cl. ................................. 707/102; 345/418
[58] Field of Search ........................... 707/102, 103, 707/101, 100; 345/333, 418

[56] References Cited

U.S. PATENT DOCUMENTS

| | | | |
|---|---|---|---|
| 4,939,689 | 7/1990 | Davis et al. | 707/102 |
| 5,016,170 | 5/1991 | Pollalis et al. | 364/401 |
| 5,634,055 | 5/1997 | Barnewall et al. | 707/103 |
| 5,671,360 | 9/1997 | Hambrick et al. | 705/9 |
| 5,689,702 | 11/1997 | Bulusu | 707/100 |
| 5,754,849 | 5/1998 | Dyer et al. | 707/101 |
| 5,864,342 | 1/1999 | Kajiya et al. | 345/418 |
| 5,874,954 | 2/1999 | Kilmer et al. | 345/333 |
| 5,884,314 | 3/1999 | Bulusu | 707/100 |
| 5,948,113 | 9/1999 | Johnson et al. | 714/38 |

Primary Examiner—Thomas G. Black
Assistant Examiner—Charles L. Rones
Attorney, Agent, or Firm—Jones & Askew, LLP

[57] ABSTRACT

A system for creating, displaying, and editing an intermediate data structure (IDS) that maintains a portion of a categorized data set (CDS) based upon an original set of hierarchically-related objects. A property of the objects is selected. The lowest-level objects matching the selected property are incrementally added to the IDS along with objects in a parent/child relationship with each added lowest-level object so long as those objects are not already within the category of the added lowest-level object. Special category objects are added to the IDS representing an object group with one value of the selected property. Objects stored within the IDS with this value are in a parent relationship with the category object. The objects stored within the IDS are displayed in an outline structure to show the functional relationships between the objects in each category.

38 Claims, 10 Drawing Sheets

| 800 | 805 | 810 | 815 |
|---|---|---|---|
| | TASK NAME | TOTAL WORK | PRIORITY |
| | PRIORITY: HIGH | 6 WEEKS | |
| 1 | T1 | 2 WEEKS | |
| 2 | T11 | 10 DAYS | HIGH |
| 4 | T2 | 4 WEEKS | |
| 6 | T22 | 20 DAYS | HIGH |

820 encompasses rows 1–6.

*FIG. 8*

SYSTEM AND METHOD FOR MANIPULATING A CATEGORIZED DATA SET

TECHNICAL FIELD

This invention generally relates to manipulating categorized data and, more particularly described, relates to creating an intermediate data structure in memory to maintain a portion of a set of categorized data based upon an original data set and selected properties of the original data set.

BACKGROUND OF THE INVENTION

As the information age sets upon us, the amount of raw information at our fingertips seems to be growing at an incredible pace. The global Internet provides access to an increasing array of remote network computers or sites, each site having its own information content or data. This expansive trend with information is also apparent within the single computer. Computer hardware, such as hard disks and processors, has generally become less expensive and more powerful, which allows the physical limits of how much information is stored to increase. But there still looms a challenge: How can one use and present this information or data to a user without having to painstakingly sift through it all?

To effectively use this information, it can be categorized based upon one or more properties of the information. This is a straight-forward technique of organizing or categorizing data. It is relatively simple and effective when dealing with a small original data set and a selected property of the data set with which to create the whole categorized data set. For example, the original data set may be a set of tasks, each task having a particular priority (high, medium, or low). Each of the tasks may possibly be made up of other tasks. The original set of tasks may be categorized based upon a property (e.g., the priority of each task) to produce a categorized set of tasks according to that property. However, when categorizing using more than one property (such as priority and who is to perform the tasks), the categorized data set becomes larger. As the categorized data set becomes larger, creating and updating the categorized data set can become problematic because of the increased time and memory resources required.

Additionally, it may be desirable to list hierarchically-related data (such as tasks) more than once when categorized in order to show the parent/child relationships of the information. In the example mentioned above, a single task in the original set of tasks may be made up of two lower-level tasks. The single task and the lower-level tasks represent a parent/child relationship where the single task is the parent and two lower-level tasks are children. As a result, it may be desirable to list the single task along with the lower-level task whenever either of the lower-level tasks are listed within the categorized data set. This lets the user of the data gain an advantageous understanding of the relationships of the data. However, this type of listing also can enormously increase the size of the categorized data set resulting in problems when creating and updating the categorized data set. For example, the original data set may have 5000 data records. Each record may be grouped or categorized by three different properties to form a categorized data set. Given that each of these properties may have 100 different values, the size of the categorized data set becomes very large. Furthermore, with the possibility of having hierarchically-related records appearing more than once within the categorized data set, the size of the categorized data set can quickly become unmanageable.

Prior ways of manipulating large categorized data sets have required the entire categorized data set to be generated in memory. While this maintains the ability to quickly access any part of the categorized data set once the categorized data set is created, it quickly becomes undesirable because of the amount of processing time and memory space needed to create the categorized data set. Furthermore, the entire categorized data set is generally regenerated or recreated from the original data set when any part of the original data set is updated or edited. Faced with these problems, prior solutions have typically limited what is included and displayed as part of the categorized data set and how any properties are used when creating the categorized data set in order to maintain adequate functionality when manipulating the categorized data set. With these prior solutions, the amount of information of the information maintained in the categorized data set is reduced in favor of adequate ease of manipulation of the categorized data set. Thus, a user is not being able to display the hierarchical relationships between the data and not able to categorize the data beyond a restricted number of levels because of the data manipulation problems associated with large categorized data sets that would result.

Accordingly, there is a need for a system for efficiently manipulating large categorized data sets that does not take a burdensome amount of processing time and memory resources when creating the categorized data set. There is also a need for a system for efficiently updating a large categorized data set in response to changes in the original data set. Furthermore, there is a need for a way of displaying the relationships of the information contained within the categorized data set.

SUMMARY OF THE PRESENT INVENTION

The present invention satisfies the above-described needs by providing a system and method for creating an intermediate data structure that maintains a portion of a categorized data set. The intermediate data structure is a buffer-like data structure which is used to enhance manipulations of the categorized data set and to embody the relationships between objects within the portion of the categorized data set. Essentially, the categorized data set is a grouping of hierarchically-related objects from an original data set. Each group of objects has a particular value of a property of the objects, thus providing a categorization of the objects from the original data set. For example, the objects may be tasks that are hierarchically-related to each other. One task may comprise many other subordinate tasks with the one task being in a parent relationship with the other subordinate tasks. Each task has one or more properties, such as a priority. The property may have different values, such as High, Medium, and Low. Thus, the categorized set of tasks would be the tasks within the original set of tasks categorized or grouped according to values of a property of the tasks, such as their priority.

In general, one or more of the properties of the hierarchically-related objects is selected, such as priority. In response to the selection of this property, a portion of the categorized data set is generated from the hierarchically-related objects in the original data set. The generated portion of the categorized data set contains objects, such as tasks, associated with the selected property. Typically, lowest-level hierarchically-related objects having a particular value of the selected property are added to the portion of the categorized data set along with other hierarchically-related objects in a parent relationship with the added lowest-level objects. The generated portion of the categorized data set is stored within the intermediate data structure in memory, typically having a predetermined size that is smaller than the size of the entire categorized data set. Thus, the intermediate data structure advantageously represents and maintains only a portion of the categorized data set in memory.

An outline structure of the objects maintained within the intermediate data structure can be displayed, generally on a computer monitor. The outline structure advantageously illustrates the relationship of the categorized information (objects) stored within the intermediate data structure. For example, parent/child relationships among the categorized information, such as categorized tasks, may be displayed as rows of tasks with subordinate or child tasks represented on a row that is indented below the row of its parent task. These rows of tasks graphically showing the relationships between the tasks essentially define the outline structure and allows the user to view such relationships between the tasks.

In this manner, the contents of large categorized data sets can be manipulated without a burdensome amount of processing time and memory resources. By using the intermediate data structure, there is no need to generate the entire contents of the categorized data set or to calculate the entire size of the categorized data set.

More particularly described, a property of the hierarchically-related objects in the original data set is selected before initializing a counter. For example, the priority property of the tasks in the original set of tasks can be selected before initializing the counter. The counter has enumerated values which correspond to the values of the selected property (e.g., High, Medium, and Low values) and the number of hierarchically-related objects in the original data set (e.g., the number of tasks). If one of the hierarchically-related objects that corresponds to the enumerated value of the counter should be in the intermediate data structure based upon the selected properties, then the object is stored in the intermediate data structure.

For one aspect of the present invention, a category object should be included if the enumerated value of the counter corresponds to a predetermined value. Essentially, the category object represents a category or group of objects. For example, a category object should be added for each of the High, Medium, and Low categories or groups of tasks. These category objects represent these respective groups of tasks.

In another aspect of the present invention, the object should be included if it is not a parent object (i.e., in a parent relationship with any other object) having the selected property. For example, if the task is one of the lowest level tasks having selected property, the task will not be a parent of any other task and should be included in the intermediate data structure.

In yet another aspect of the present invention, the object should be included if (1) the object is a parent object (i.e., in a parent relationship with another object) which is already in the intermediate data structure and which has the same selected property and (2) the parent object is not already in the intermediate data structure relative to the other object. For example, a parent or summary task with several subordinate tasks, two of which are High priority tasks, are in the original set of tasks. The parent task should be included in the intermediate data structure if one of the High priority tasks is in the intermediate data structure and the parent task is not already included in the intermediate data structure. If the parent task was already included in the intermediate data structure relative to one of the High priority tasks, the parent task is not added again relative to the other High priority task.

In this situation, the object is capable of appearing more than once within the intermediate data structure when the intermediate data structure contains any other of the hierarchically-related objects that are in a child relationship with the other object. For example, if the parent task has subordinate or child tasks that are High priority tasks and Low priority tasks, the parent task can appear twice in the intermediate data structure. One instance of the parent task would be in the High category group of tasks relative to the High subordinate task. The other instance of the parent task would be in the Low category group of tasks relative to the Low subordinate task. This provides the advantage of having object appearing more than once in order to show hierarchical parent/child relationships of the objects once categorized.

In response to an incremented enumerated value of the counter, an inquiry is conducted to determine if another of the hierarchically-related object corresponds to the new enumerated value of the counter, as described above. This process is repeated until the number of objects stored within the intermediate data structure exceeds a predetermined size threshold.

In another aspect of the present invention, a method is described for editing an intermediate data structure that maintains a portion of a categorized data set based upon an original data set having a plurality of hierarchically-related objects. In general, a notification signal is received that identifies one of the hierarchically-related objects from the original data set that has been updated. In response to receiving the notification signal, an inquiry is conducted to determine if the identified object appears within the intermediate data structure.

If the identified object appears within the intermediate data structure, the contents of the intermediate data structure are edited to reflect updates made to the identified object in the original data set. Typically, the contents of the intermediate data structure are edited by modifying the value of an object in the intermediate data structure, inserting a new object corresponding to a new object to the original data set, or deleting an object corresponding to a deleted object from the original data set.

Thus, only a portion of a large categorized data set is updated in response to changes in the original data set as opposed to re-regenerating the entire categorized data set. This is advantageous because editing the intermediate data structure as described reduces the amount of time and memory resources required to manipulate the contents of large categorized data sets.

Additionally, an inquiry can be conducted to determine if one of the updated objects from the original data set appears within the categorized data set below the portion of the categorized data set maintained within the intermediate data structure. If so, an object (a first object) within the intermediate data structure is edited if the value of the first object is derived from the value of the updated object in the original data set. For example, this occurs if a summary or parent task (first object) appears in the intermediate data structure and has a value that is derived from one of its subordinate or child tasks (updated object). In this manner, the first object in the intermediate data structure reflects changes made to the updated object from the original data set, even though the updated object from the original data set does not appear in the intermediate data structure.

The present invention and its advantages, those described above and otherwise, will be appreciated from studying the following detailed description and drawings, and the appended claims.

BRIEF DESCRIPTION OF THE DRAWINGS

FIG. 8 is a screen display of an outline structure of the contents of an exemplary intermediate data structure.

DETAILED DESCRIPTION OF THE PREFERRED EMBODIMENT

Figure 1:
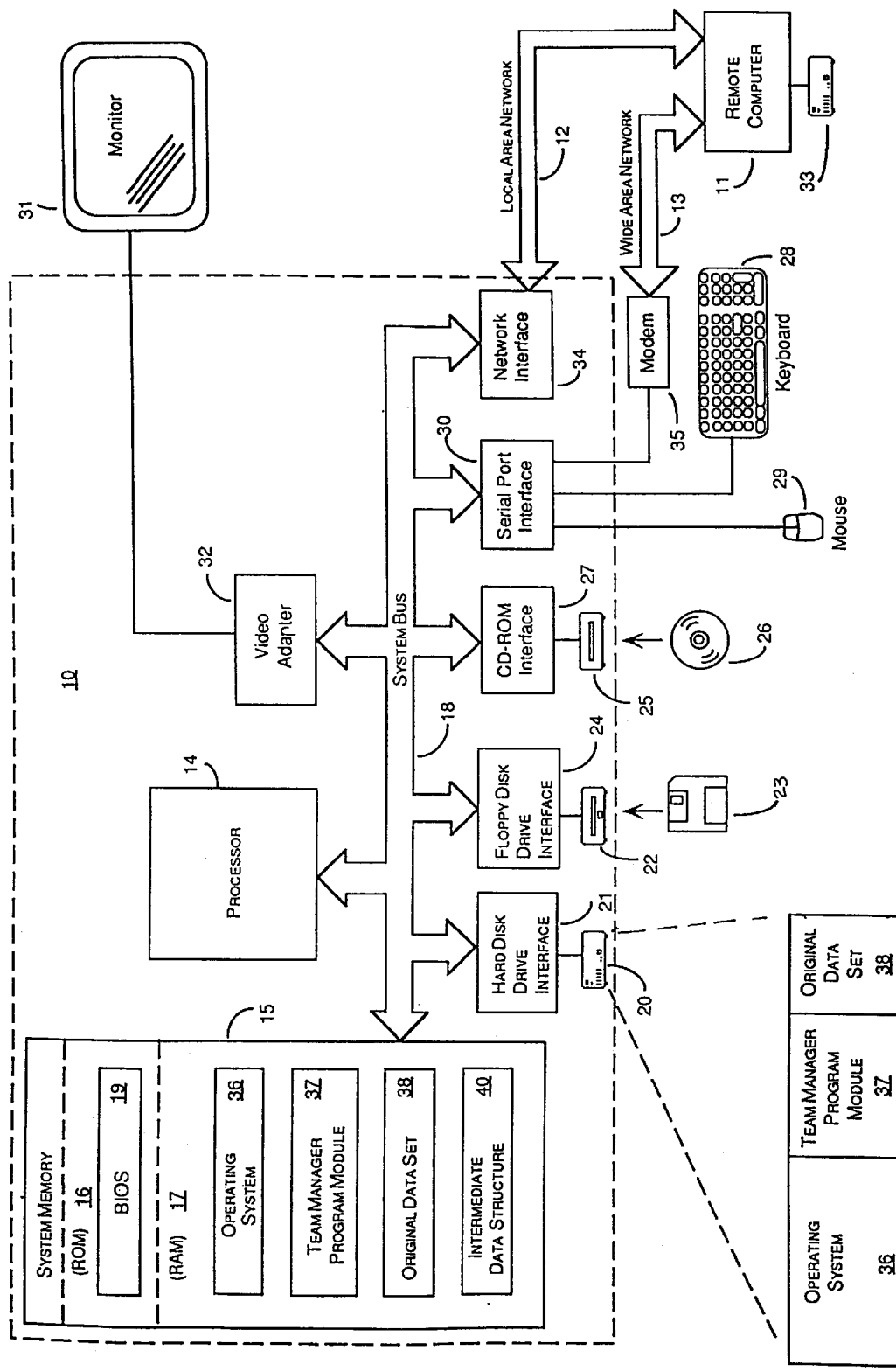
FIG. 1 is a block diagram of a personal computer that provides the operating environment for the preferred embodiment of the present invention.

The present invention is directed to a system for creating an buffer-like data structure, referred to as an intermediate data structure, which maintains a portion of a categorized data set in order to enhance manipulations of the categorized data set. The intermediate data structure also maintains an outline structure that embodies the relationships between objects within the portion of the categorized data set. The preferred embodiment of the present invention is represented by a program module called "TEAM MANAGER", which is developed by Microsoft Corporation of Redmond, Washington. The "TEAM MANAGER" program module can be used to consolidate, coordinate and manage a team's activities or tasks.

Briefly described, the "TEAM MANAGER" program module (TM program module) allows users to categorize tasks. In other words, the TM program module allows users to organize tasks into useful groups based upon selected properties of the tasks. A task is essentially a piece of information with certain properties that is stored in a data object. Rather than generate an entire set of categories and categorized tasks based upon selected properties, the TM program module creates an intermediate data structure that acts as a cached buffer for maintaining a portion of the entire categorized set of tasks. The intermediate data structure is sufficiently large to allow a user to scroll through several screens full of categorized information while remaining small enough to still facilitate rapid creation and updating of the intermediate data structure. The TM program module is able to display the categorized contents of the intermediate data structure on a computer monitor in an outline structure that shows the relationships between tasks that are subordinate to other tasks. The creation and use of the intermediate data structure is the focus of the present application.

Although the preferred embodiment will be generally described in the context of tasks, a TM program module, and an operating system running on a personal computer, those skilled in the art will recognize that the present invention also can be implemented in conjunction with data objects and other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

The detailed description which follows is represented largely in terms of processes and symbolic representations of operations by conventional computer components, including a processor, memory storage devices, connected display devices such as monitors, and input devices. Furthermore, these processes and operations may utilize conventional computer components in a heterogeneous distributed computing environment, including remote file servers, compute servers, and memory storage devices. Each of these conventional distributed computing components is accessible by the processor via a communication network.

The processes and operations performed by the computer include the manipulation of signals by a processor and the maintenance of these signals within data sets or data structures resident in one or more memory storage devices. In the context of the present invention, a "data set" is a collection of related information in separate elements that are manipulated as a unit. A "data structure" is a structured organizational scheme that encapsulates data in order to support data interpretation and data operations. The data structure imposes a physical organization upon the collection of data (e.g., data objects organized by selected properties of the data objects) stored within a memory storage device and represents specific electrical or magnetic elements. In the context of the present invention, a data structure can be created from the separate elements or objects of a data set. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, nodes, numbers, points, data, entries, objects, images, files or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, comparing, editing, receiving, determining, identifying, storing, selecting, incrementing, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processor 14, preferably the "PENTIUM" family of microprocessors manufactured by Intel Corporation of Santa Clara, California. However, it should be understood that the invention can be implemented on computers based upon other microcontrollers or microprocessors, such as the "MIPS" family of microprocessors from the Silicon Graphics Corporation, the "POWERPC" family of microprocessors from both the Motorola Corporation and the IBM Corporation, the "PRECISION ARCHITECTURE" family of microprocessors from the Hewlett-Packard Company, the "SPARC" family of microprocessors from the Sun Microsystems Corporation, or the "ALPHA" family of microprocessors from the Digital Equipment Corporation.

The personal computer 10 also includes system memory 15 (including read only memory (ROM) 16 and random access memory (RAM) 17), which is connected to the processor 14 by a system bus 18. Although the system bus 18 pictorially reflects a single data/address bus as illustrated in FIG. 1, those skilled in the art will recognize that the system bus 18 may comprise one or more nested bus architectures running at different speeds depending on the needs of the devices connected to the system bus 18.

The BIOS 19 for the personal computer 10 is stored in ROM 16. Those skilled in the art will recognize that the BIOS 19 is a set of basic routines that helps to transfer information between components within the personal computer 10. However, it should be appreciated that other types of computers may transfer information between elements within the computer without the use of a BIOS 19 and that the invention can readily be implemented in such computers without a BIOS 19.

Within the personal computer 10, a hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27.

A user enters commands and information into the personal computer 10 by using a keyboard 28 and/or a pointing device, such as a mouse 29, which are connected to the system bus 18 via a serial port interface 30. Typically, the mouse 29 is used to position a cursor on a computer monitor 31 and has a left button and a right button that are each used to select information displayed on the computer monitor 31. Other types of pointing devices (not shown in FIG. 1) include track pads, track balls, joy sticks, data gloves, head trackers, and other devices suitable for positioning the cursor on the computer monitor 31. The monitor 31 or other kind of display device is connected to the system bus via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. I as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules and data are provided to the personal computer 10 via one of the local or remote memory storage devices or computer-readable media, which may include the hard disk drive 20, floppy disk 23, CD-ROM 26, RAM 17, ROM 16, and the remote memory storage device 33. The present invention is not limited to these specific memory storage devices as one skilled in the art can contemplate other computer-readable medium or memory storage devices, such as magneto-optical disks (not shown), optical memory devices (not shown), and digital tapes (not shown). In the preferred embodiment, these program modules provided to the computer 10 include an operating system 36 and the "TEAM MANAGER" program module (TM program module) 37. In the preferred personal computer 10, the hard disk drive 20 is used to store these program modules once they are installed from a CD-ROM 26.

As previously mentioned, data is stored on one of the memory storage devices, such as RAM 17, the hard disk drive 20, or the floppy disk 23. In the preferred embodiment, data is stored in a variety of components, such as an original data set 38 or an intermediate data structure (IDS) 40. The original data set 38 is created by the TM program module 37 and essentially is a data set of hierarchically-related objects, preferably a set of related tasks, maintained in RAM 17 and on the hard disk drive 20. The IDS 40 is a data structure created by the TM program module 37 based upon the contents of the original data set 38 and a selected property of the tasks. The IDS 40 is preferably maintained in RAM 17, but may be stored and maintained on the hard disk drive 20 as well.

When the personal computer 10 is turned on or reset, the Basic Input/Output System (BIOS) 19, which is stored in the ROM 16, instructs the processor 14 to load the operating system 36 from the hard disk drive 20 into the RAM 17. Once the operating system 36 is loaded into RAM 17, the processor 14 executes the operating system 36 and causes the visual elements associated with the user-interface of the operating system 36 to be displayed on the monitor 31.

The operating system 36, in conjunction with the BIOS 19 and associated device drivers, provides the basic interface between the computer's hardware and software resources, the user, and the TM program module 37. The operating system 36 interprets and carries out instructions issued by the user. For example, when the user wants to load a program module, such as the TM program module 37, the operating system 36 interprets the instruction (e.g., double clicking on an icon representing the program module) and causes the processor 14 to load code associated with the program module into RAM 17 from either the hard disk drive 20, floppy disk 23, CD-ROM 26, or the remote memory storage device 33. Once the program module is loaded into the RAM 17, it is executed by the processor 14. In case of large programs, the processor 14 loads various portions of program modules into RAM 17 as needed.

As discussed earlier, the preferred embodiment of the present invention is embodied in the preferred TM program module 37, which is designed to operate in conjunction with Microsoft Corporation's "WINDOWS 95" or "WINDOWS NT" operating systems. However, it should be understood that the invention can be implemented for use with other operating systems, such as IBM Corporation's "OS/2" operating system and "AIX" operating system, SunSoft's "SOLARIS" operating system used in workstations manufactured by Sun Microsystem, Hewlett-Packard's "HP-UX" operating system, and the operating system used in "MACINTOSH" computers manufactured by Apple Computer, Inc.

Those skilled in the art will appreciate that the preferred TM program module 37 provides a wide variety of features and functions in addition to those included in the brief description presented above.

The TM Program Module

Figure 2:
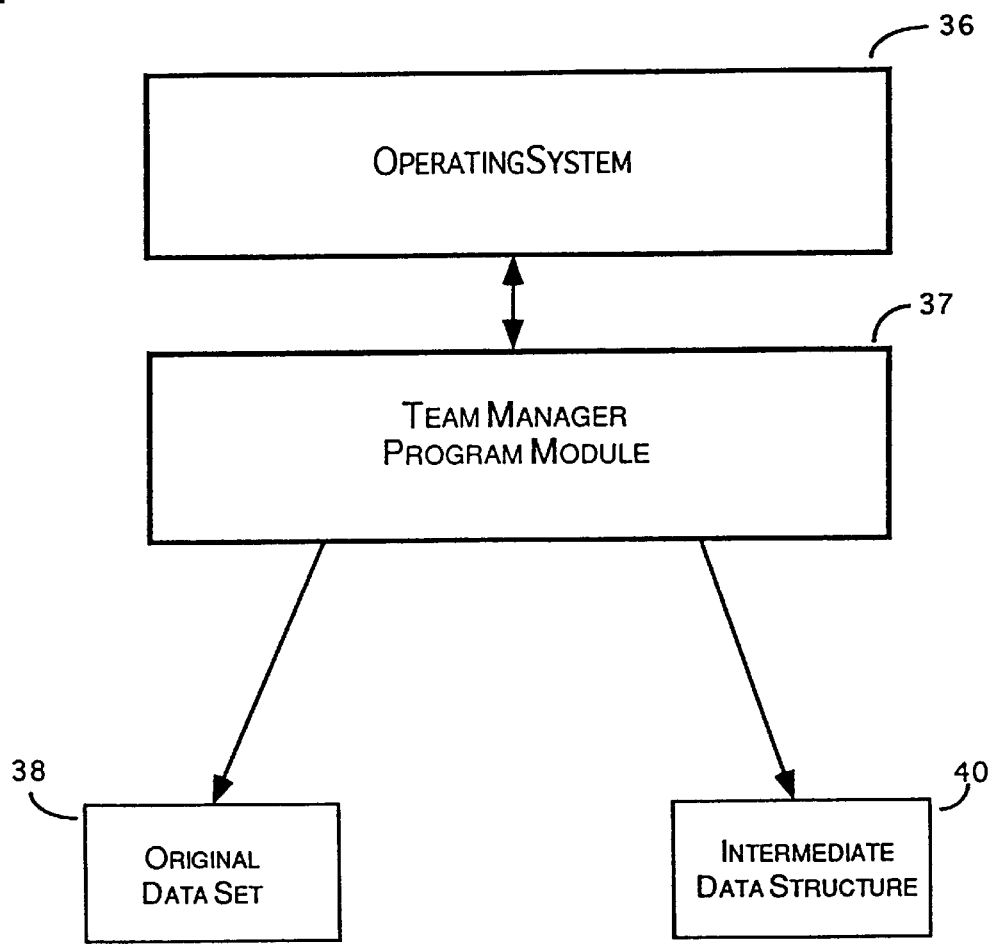
FIG. 2 is a block diagram illustrating the interaction between the preferred software modules and preferred data structures.
Figure 3:
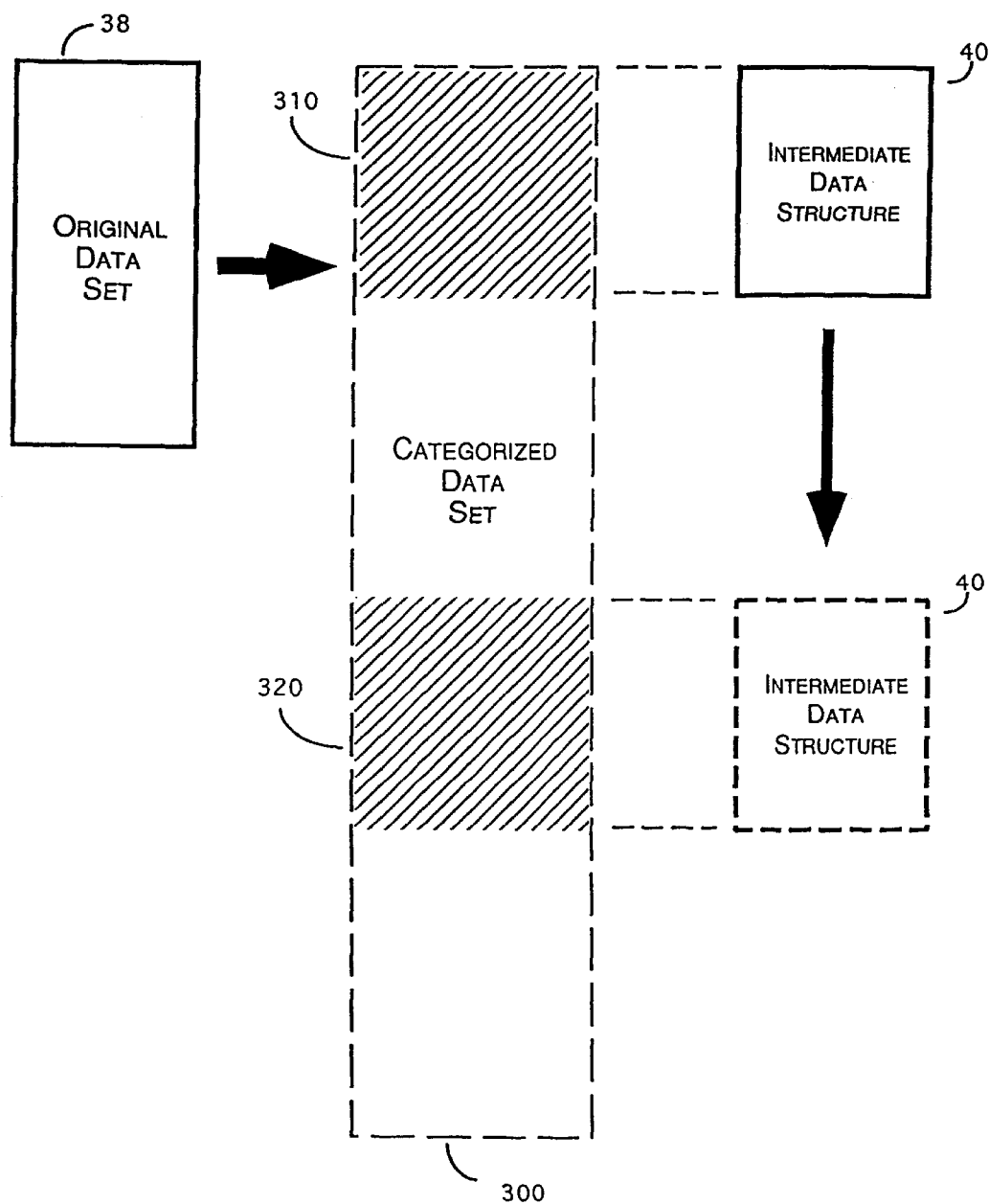
FIG. 3 is a diagram illustrating the relationships between an original data set, a categorized data set, and an intermediate data structure.
Figure 4:
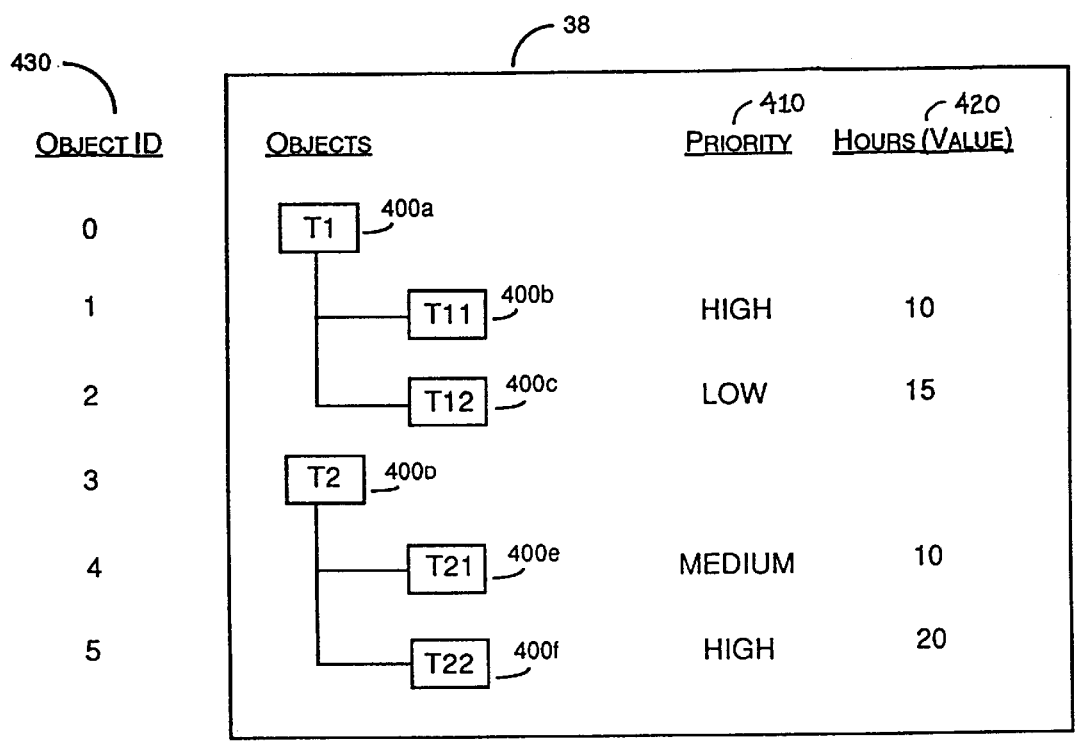
FIG. 4 is a diagram illustrating the contents of an exemplary original data set.
Figure 5:
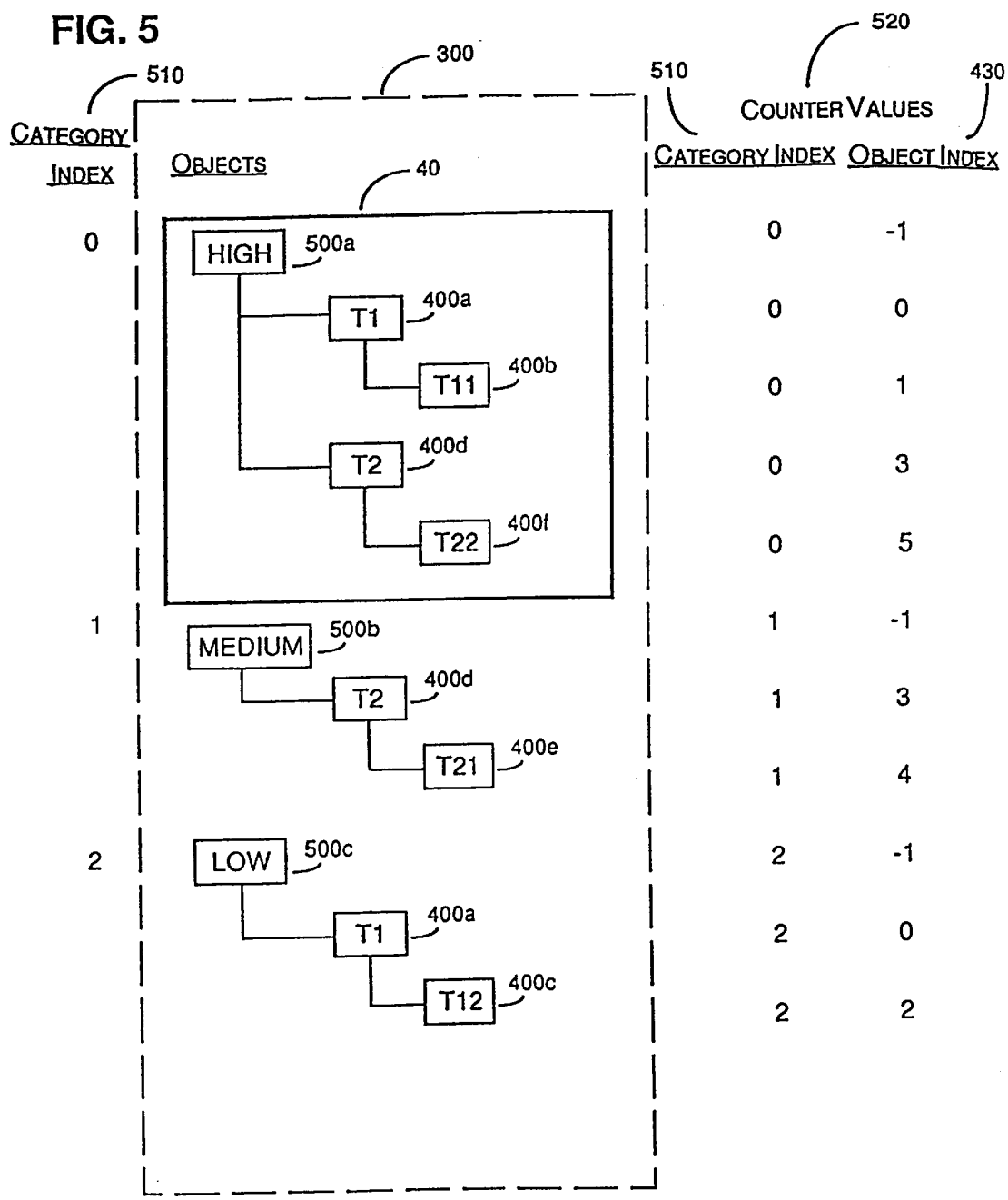
FIG. 5 is a diagram illustrating the contents of an exemplary categorized data set and an exemplary intermediate data structure created from the exemplary original data set.
Figure 6:
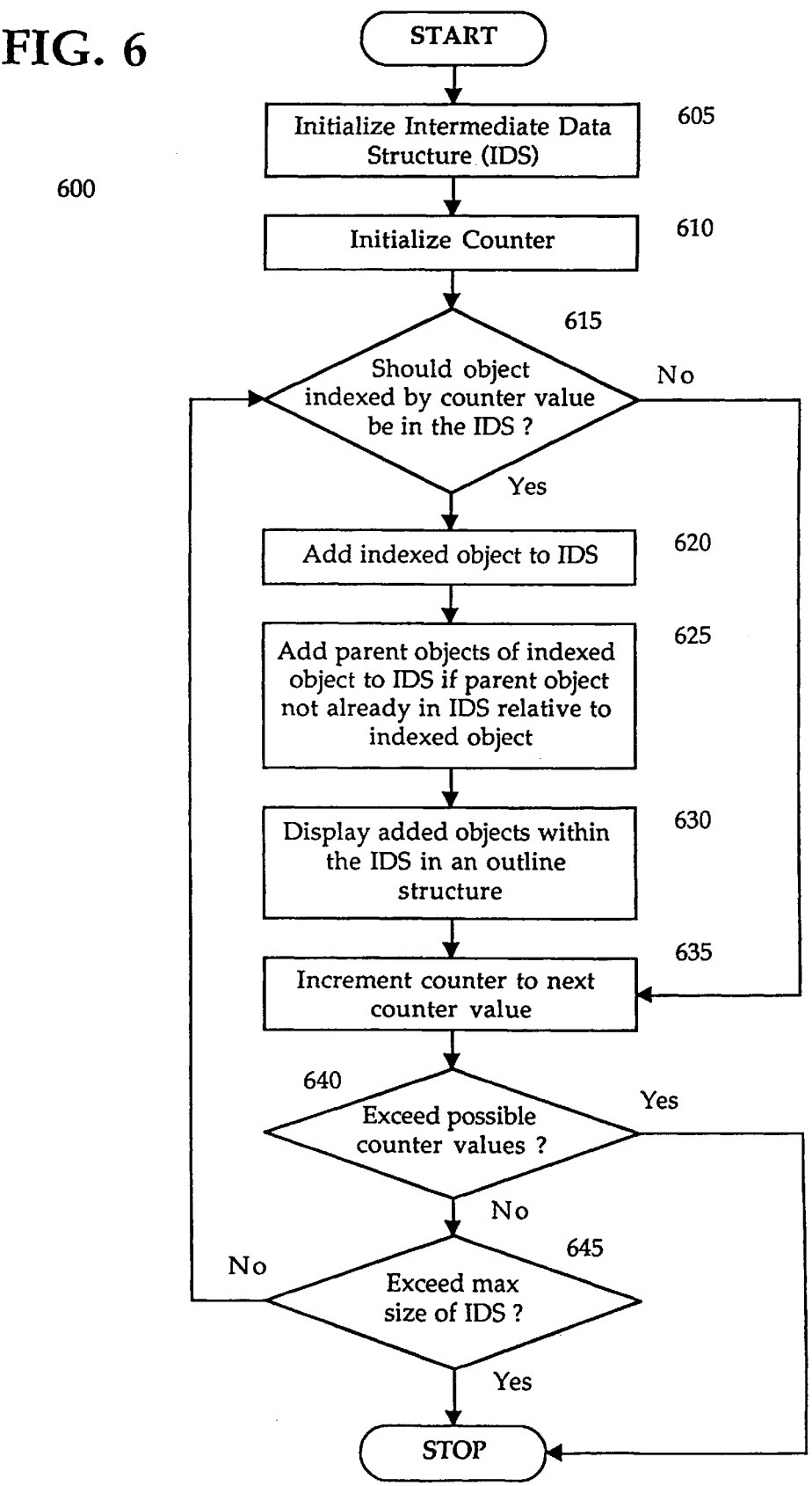
FIG. 6 is a flow diagram illustrating steps of the preferred method for creating an intermediate data structure that maintains a portion of a categorized data set.
Figure 7:
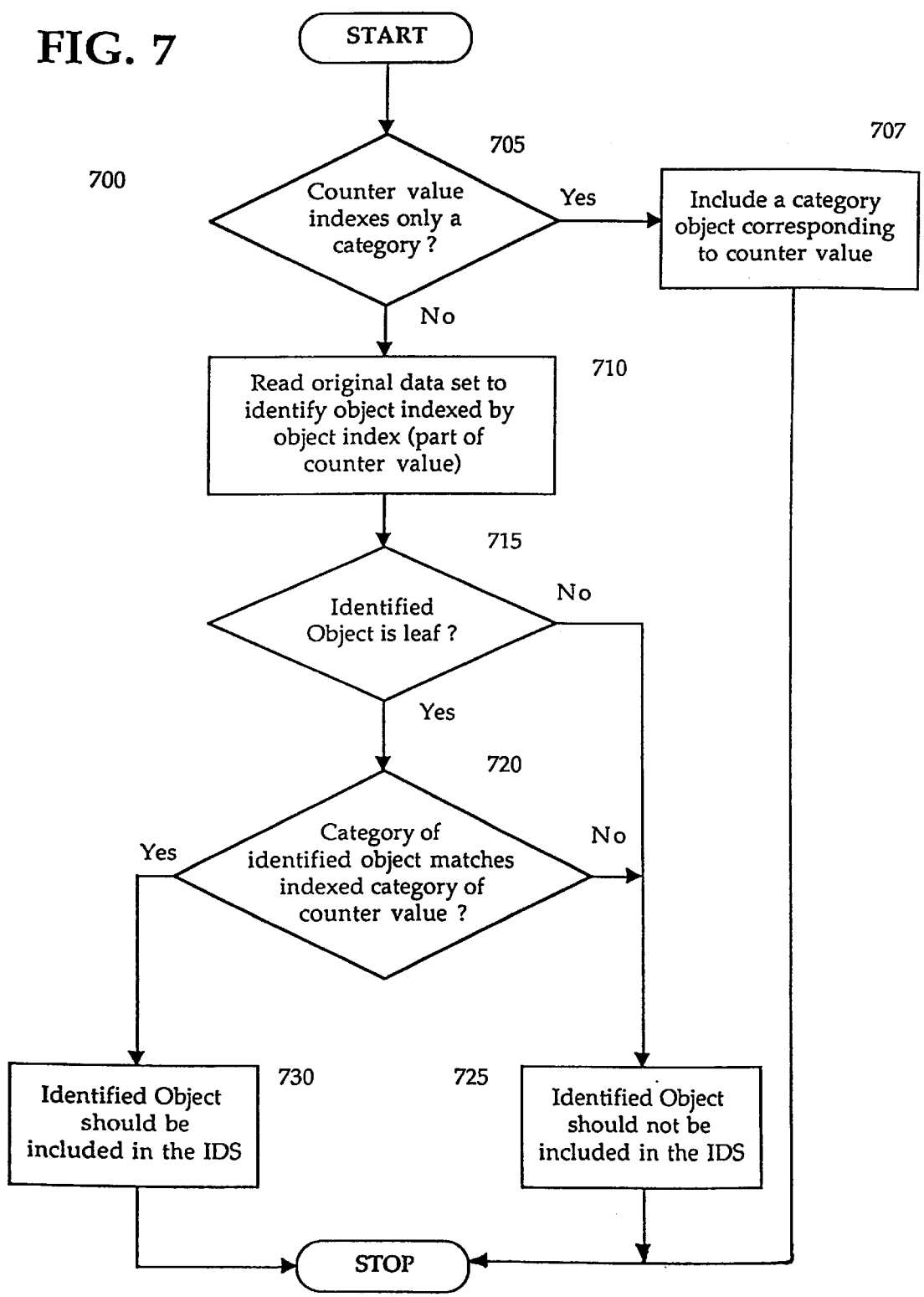
FIG. 7 is a detailed flow diagram illustrating the preferred steps for determining if an object from an original data set should be included within an intermediate data structure.
Figure 9:
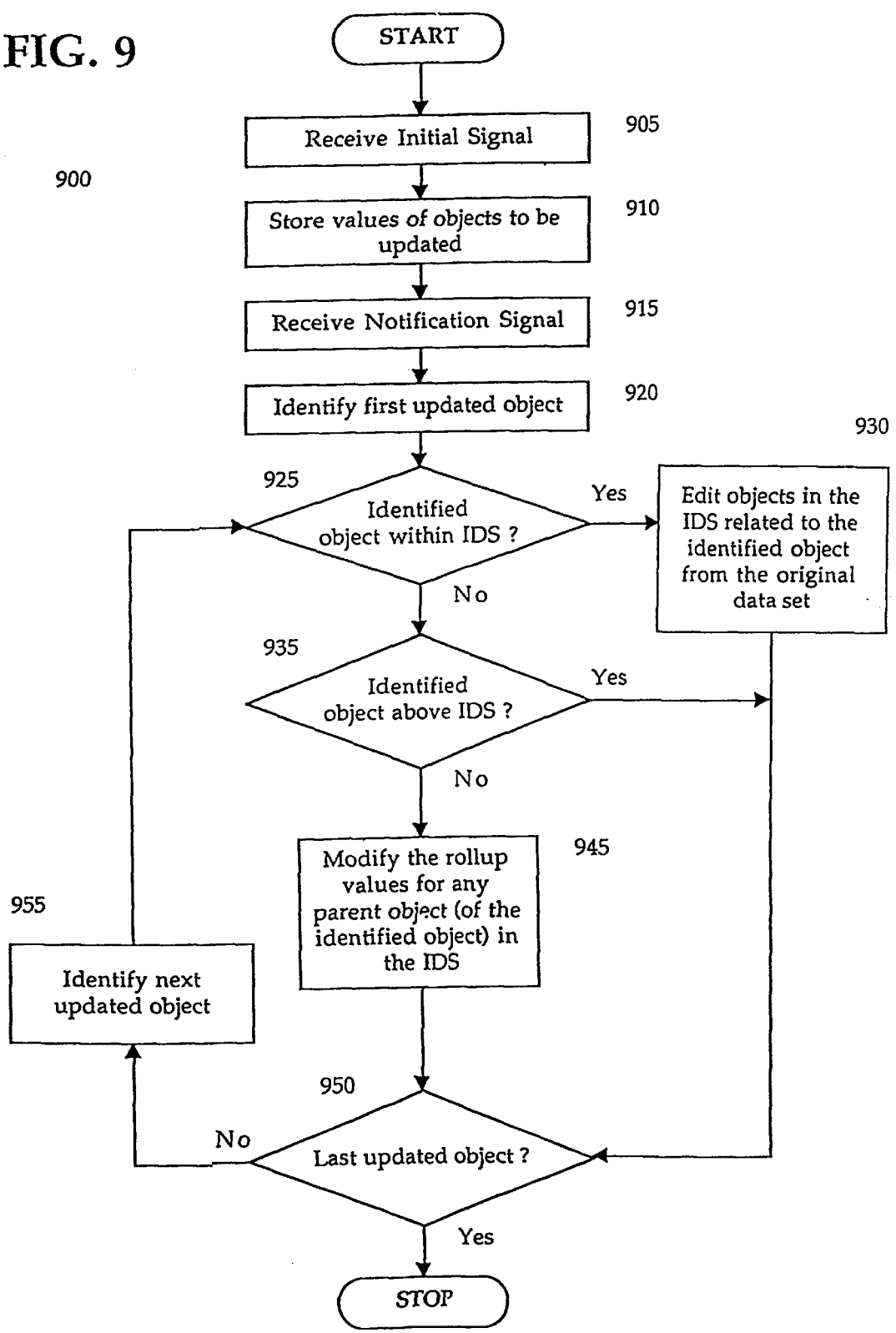
FIG. 9 is a flow diagram illustrating the steps of the preferred method for editing an intermediate data structure that maintains a portion of a categorized data set.
Figure 10:
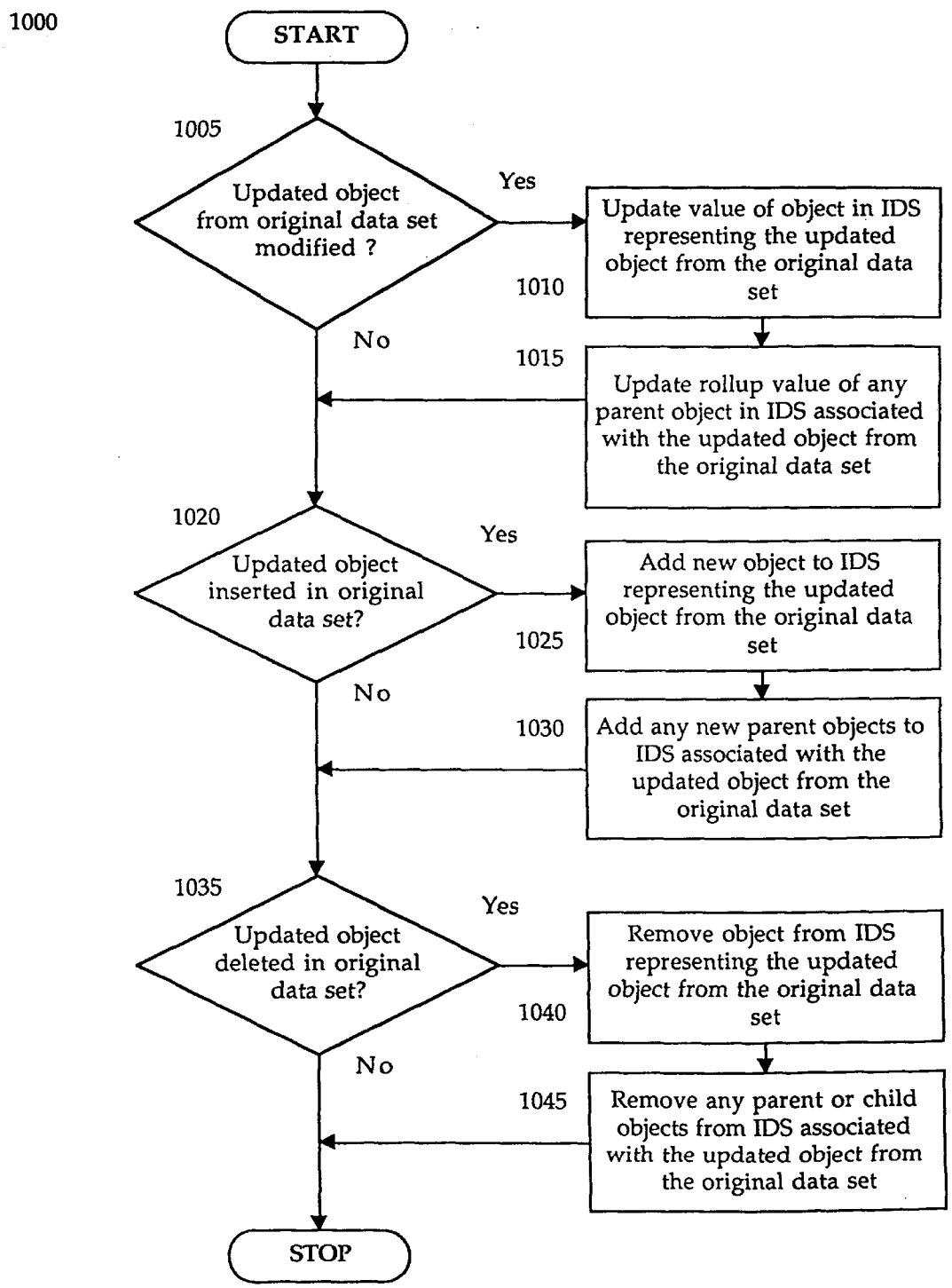
FIG. 10 is a detailed flow diagram illustrating the preferred steps for editing objects in an intermediate data structure in response to changes in an original data set.

Turning now to FIGS. 2–10, the preferred embodiment of the present invention is described. FIG. 2 is a diagram illustrating the preferred software module, an original data set, and an IDS. FIG. 3 is a diagram illustrating the relationships between an original data set, a categorized data set, and an IDS. FIGS. 4 and 5 are diagrams illustrating the contents of exemplary data sets and an exemplary IDS. FIGS. 6 and 7 are flow diagrams illustrating the preferred method for creating in memory an IDS that maintains a portion of a categorized data set. FIG. 8 is an exemplary screen display illustrating the outline structure of an IDS when displayed on a computer monitor. FIGS. 9 and 10 are flow diagrams illustrating the preferred method for editing or updating the contents of an IDS in response to an update to the contents of an original data set.

Referring now to FIGS. 1 and 2, the preferred TM program module 37 is illustrated as a software component that reads the contents of the original data set 38 when creating the IDS 40 in memory. Although the IDS 40 represents a portion of a categorized data set, it is important to realize that an advantage presented by the present invention is the ability to create portions of the categorized data set without having to create the entire categorized data set. This concept is explained in more detail below with regard to FIG. 3.

Additionally, the TM program module 37 is able to respond to inputs from the user via messages from the operating system 36. In this manner, a user is able to make selections, using input devices such as the mouse 29 or the keyboard 28, that are transformed into signals which are sent to the TM program module 37. The TM program module 37 interprets these conventional messaging signals from input devices in order to create or edit the IDS 40.

As will be discussed in more detail below with regard to FIGS. 4 and 5, the original data set 38 comprises tasks (generally called objects) that are hierarchically-related to each other. In other words, some tasks may be part of or subordinate to other tasks. In this manner the tasks can be in a parent/child type of relationship. Additionally, each of the tasks has properties that can be selected in order to group the tasks in the original data set 38. The IDS 40 maintains copies of certain tasks from the original data set 38 as well as category items (special objects in the IDS denoting a category of tasks) arranged in an outline structure. The outline structure is displayed as specific groupings within the IDS 40 showing the grouped relationships and can be shown on the computer monitor 31 to show the grouped relationships of the contents of the IDS 40.

FIG. 3 is a diagram illustrating the relationships between the original data set, a categorized data set based upon the original data set, and an IDS based upon the original data set. Referring now to FIGS. 1 and 3, the IDS 40 is preferably created by the TM program module 37 based upon the content (objects) of the original data set 38 and a selected property with which to group or categorize the content of the original data set 38. In the preferred embodiment, the content of the original data set 38 represents tasks and the selected property is a property of these tasks.

Basically, categorizing the content of the original data set 38 means that the content (objects that preferably represent tasks) is organized into useful groups based upon the selected property. In the preferred embodiment, categorizing all tasks within the original data set 38 based upon a selected property of the tasks (such as the priority of each task) would create a categorized data set 300. This categorized data set 300 would include groups of tasks based upon values of the selected property. For example, the categorized data set 300 would include a group of High priority tasks, Medium priority tasks, and Low priority tasks if the selected property was the priority of the tasks.

While categorizing the tasks is useful, those skilled in the art will recognize that the size of the categorized data set 300 becomes very large when the number of objects in the original data set 38 is large, the number of properties selected is more than one, the number of different values of the selected property is large, and there is a desire to include within the categorized data set 300 all objects related to a given value of the selected property. When such conditions occur, creating and manipulating the categorized data set 300 becomes cumbersome. Thus, it is advantageous to create merely a portion of the categorized data set 300 rather than the entire categorized data set 300. Thus, in the preferred embodiment of the present invention, the IDS 40 maintains the created portion of the categorized data set 300 of tasks from the original data set 38.

The IDS 40 is analogous to a "sliding window" in which to view a portion of the contents of the categorized data set 300. It is important to understand that the categorized data set 300 is shown in dashed lines in FIG. 3 to indicate it is never actually generated. The categorized data set 300 is shown merely as a reference of what the IDS 40 represents. For example, the IDS 40 maintains and represents a top portion 310 of what is in the categorized data set 300 when the IDS 40 is initially created. However, if the user desires to view another portion of the categorized objects or tasks of the categorized data set 300, the content of the IDS 40 can be regenerated to maintain and represent another portion 320 of what is in the categorized data set 300. In this manner, the IDS 40 is created and dynamically maintains a sliding window into the categorized contents of the original data set 38 (as would be stored within a portion of the categorized data set 300 if the categorized data set 300 were created).

Additionally, edits or changes to tasks in the original data set 38 are reflected within the IDS 40 after the TM program module 37 is made aware of the updated tasks and determines if the updated task requires a change to the categorized contents of the IDS 38. Some updated tasks may not appear within the IDS 38 but may still affect the contents of the IDS 38. The manner in which the IDS 38 is updated is discussed in more detail below with regard to FIGS. 9 and 10.

FIGS. 4 and 5 provide background information on the contents of an exemplary original data set of tasks and a corresponding exemplary categorized set of tasks. This background information is helpful in understanding how the IDS 40 is created from the objects within the original data set 38.

Referring now to FIGS. 1, 3, and 4, the exemplary original data set 38 is displayed as containing a number of objects 400*a–f*, preferably called tasks. As previously mentioned, these tasks are hierarchically-related. For example, the T1 task 400*a* is in a parent relationship with the T11 task 400*b* and the T12 task 400*c* and the T11 task 400*b* and the T12 task 400*c* are in a child or subordinate relationship with the T1 task 400*a*. Thus, the T1 task 400*a* is called a "summary" type of task with other subordinate tasks from the original data set 38 within the hierarchy. In this example, the T11 task 400*b* is called a "leaf" task in that it is not in a parent relationship with any other task from the original data set 38. Although the T11 task 400*b* is shown as a "leaf" task, those skilled in the art will recognize that the T11 task 400*b* could have been defined to have other tasks nested below the T11 task 400*b*. Therefore, for purposes of simplicity and to avoid confusion, the exemplary original data set 38 is shown to have only two levels within the hierarchy. However, the present invention is not limited to only two levels of hierarchically-related objects.

In the preferred embodiment, each task 400*a–f* has defined properties similar to specific fields of a database record. The tasks 400*a–f* can be categorized or grouped according to these properties. In the exemplary original data set 38, each task 400*a–f* has properties concerning priority 410 (High, Medium, or Low priority) and hours 420 (a numeric range). For example, the T11 task 400*b* and the T22 task 400*f* have "High" values for the priority property while the T21 task 400*e* has a "Medium" value and the T12 task 400*c* has a "Low" value. Those skilled in the art will understand that the present invention is not limited to the properties or the values of the properties shown in the above-described example.

Additionally, each task 400*a–f* or object in the original data set 38 has a unique object ID 430 assigned for reference purposes which is stored within the original data set 38. The object ID 430 is used by the TM program module 37 when referring to specific tasks (objects) within the original data set 38 while creating and updating the IDS 40.

Based upon the contents of the exemplary original data set 38, the tasks or objects within the original data set 38 can be grouped or categorized once a property is selected for grouping. FIG. 5 is a diagram illustrating what the contents of the categorized data set 300 would be if the categorized data set 300 were actually entirely generated.

Referring now to FIGS. 1, 3, 4, and 5, categorization of the original data set 38 can begin once one or more of the properties of the objects or tasks have been selected. The exemplary categorized data set 300 (displayed in FIG. 5 as if it was actually generated in memory) would contain rows of certain tasks or objects from the original data set 38 as well as rows of special category objects 500*a–c* representing a particular grouping of the tasks based upon a value of the selected property. For example, if the selected property is the priority 410 of each task 400*a–f*, the tasks 400*a–f* from the original data set 38 would accordingly be categorized into three different groups or categories:

HIGH Priority Tasks (listed in the categorized data set 300 below a High Priority category object 500*a*)

a MEDIUM Priority Tasks (listed in the categorized data set 300 below a Medium Priority category object 500*b*)

LOW Priority Tasks (listed in the categorized data set 300 below a Low Priority category object 500*c*)

Each of the categories are designated by a particular value in a category index 510. In the exemplary embodiment, the High priority category is indexed with a value of "0", the Medium priority category is indexed with a value of "1", and the Low priority category is indexed with a value of "2". These index values are preferably used by the TM program module 37 to refer to each of the different categories. In this exemplary embodiment where only one property is selected, there is only one category index based on the selected property. However, if multiple properties are selected (nested groupings), then there would be more than one category index such that there would be index values for each value of each selected property.

The HIGH priority tasks would include each of the lowest-level tasks (leaf tasks) having a "High" value priority, such as the T11 task 400*b* and the T22 task 400*f*. If these were the only objects or tasks from the original data set 38 that appeared within the categorized data set 300, it would be similar to a sorting operation. However, the present invention allows for objects from the original data set 38 to appear more than once within a categorized data set 300 in order to show the relationships between "summary" objects and "leaf" or low-level objects. Accordingly, the HIGH priority tasks would also preferably include each of the tasks in a parent relationship with each of the lowest-level tasks having a "High" value priority. In the exemplary original data set 38, the T1 task 400*a* is in a parent relationship with the T11 task 400*b* that has a "High" value priority. Additionally, the T2 task 400*d* is in a parent relationship with the T22 task 400*f* that has a "High" value priority. Thus, the T1 task 400*a* is included within the High priority task group above the T11 task 400*b* and the T2 task 400d is included within in the High priority task group above the T22 task 400f in order to show the relative relationships between these tasks.

In the preferred embodiment, a summary task or object in the categorized data set 300, such as the T1 task 400*a* in the High priority task group, may have a value that summarizes the values of any its own subordinate tasks (objects) in that particular group. In this manner, the user is able to see a relative summary value for the categorized data. Thus, the value of the T1 task 400*a* in the High Priority group within the categorized data set 300 is 10 because that is the sum of all of the lowest-level tasks that are subordinate to or in a child relationship with the T1 task 400*a* in that particular grouping. This feature, called a "roll-up" field value, is also available for category objects as well. For example, the High Priority category object 500*a* has a value that summarizes all of the subordinate lowest-level tasks in the High priority grouping. Thus, the High Priority category object 500*a* has a value of 30 (the sum of the T11 task 400*b* value of 10 and the T22 task 400*f* value of 20).

Similar to the HIGH priority task group, the MEDIUM priority tasks would include each of the lowest-level tasks (leaf tasks) having a "Medium" value priority, such as the T21 task 400*e*, and each of the tasks in a parent relationship with each of the lowest-level tasks having a "Medium" value priority, such as the T2 task 400*d*. Thus, the T2 task 400*d* is included within "Medium" priority task group in the categorized data set 300 above the T21 task 400*e* in order to show the relative relationships between these tasks.

Finally, the LOW priority tasks would include each of the lowest-level tasks (leaf tasks) having a "Low" value priority, such as the T12 task 400*c*, and each of the tasks in a parent relationship with each of the lowest-level tasks having a "Low" value priority, such as the T1 task 400*a*. Thus, the T1 task 400*a* is included within "Low" priority task group in the categorized data set 300 above the T12 task 400*c* in order to show the relative relationships between these tasks.

Those skilled in the art will recognize that by including in the categorized data set 300 each of the tasks which are in a parent relationship with each of the lowest-level tasks (summary tasks) and which have a particular value of the selected property, summary tasks may appear more than once within the categorized data set 300. For example, the T1 task 400*a* appears within the High priority task group (because of the parent relationship with the T11 task 400*b*) and also appears within the Low priority task group (because of the parent relationship with the T12 task 400*c*).

In the preferred embodiment, each of the objects or tasks within the categorized data set 300 is specifically indexed by an enumerated counter value 520. The enumerated value for each object is preferably made up of (1) the category index 510 indicating the category group to which the object belongs and (2) an object index 430 corresponding to object IDs of objects from the original data set 38 (or corresponding to a predetermined value, such as −1, for special category objects). In this manner, the enumerated values identify the list of categorized objects in each of the categories in a specific order based upon the category index value and the object index value.

The above-described exemplary categorized data set 300 is relatively simple and not very large. However, the categorized data set 300 can potentially be very large if there are a large number of objects within the original data set 38 are large and if there are many levels of the hierarchically-related objects leading to a vast number of summary objects included in the categorized data set 300 for each leaf object.

Therefore, instead of calculating the size of the categorized data set 300 and generating the entire categorized data set 300, the TM program module 37 advantageously calculates only a portion of the categorized data set 300 in a "top-down" fashion (without ever having to generate the entire categorized data set 300) and stores each row of this portion of the categorized data set 300 in the IDS 40.

In general, the IDS 40 operates as a specialized type of buffer of a portion of the contents of the categorized data set 300. In the preferred embodiment, the IDS 40 is created in memory, row by row, until the IDS 40 reaches a predetermined size. For example, if the predetermined size was 5 rows (5 objects), the IDS 40 would grow to include the objects within the outlined portion representing the contents of the IDS 40 that is displayed in FIG. 5, while not including the remaining objects of the categorized data set 300. In the preferred embodiment, the predetermined threshold size of the IDS 40 is chosen to be 300 rows (300 objects). This allows a user to view and move around approximately 4 vertical pages worth of categorized tasks without having to recreate or regenerate the IDS 40 from the original data set 38.

In summary, once created in memory, the IDS 40 can be "scrolled down" to view another portion 320 of the categorized objects from the categorized data set 300. Essentially, the top rows of the IDS 40 are taken out and replaced with additional rows on the bottom of the IDS 40. A similar procedure occurs when "scrolling up" to view a different portion of the contents of the categorized data set 38. In this manner, the IDS 40 operates as a cached buffer for efficiently maintaining a portion of the categorized data set 300.

Creating the Intermediate Data Structure

With the above preface on the contents of an original data set 38 and what is created when the original data set 38 is categorized, the preferred method of creating the IDS 40 in memory is described more fully below with regard to FIGS. 6 and 7. FIG. 6 is a flow diagram illustrating the preferred steps for creating the IDS 40 in memory that maintains a portion of the categorized data set 300.

Referring now to FIGS. 1, 3, 4, 5, and 6, the preferred method 600 begins at step 605 where the IDS 40 is initialized in memory. In the preferred embodiment, this initializes the size of the IDS 40 to zero and establishes the maximum size of the IDS 40 to 300.

At step 610, a counter is initialized to a designated counter value. In the preferred embodiment, the counter has a value with two components that correspond to each possible category index and to each possible object index. In other words, in the example from FIGS. 4 and 5, the counter has a first component in the 0 to 2 range (category index) and a second component in the −1 to 5 range (references to objects in the original data set 38 with −1 being a reference to a special category object). Thus, the counter has possible values from (0, −1) to (2, 5) in the above-mentioned example and is initialized to a first of the enumerated values (0, −1).

In the preferred embodiment, the TM program module 37 maintains two other counters. A top counter is updated when adding rows to the top of the IDS 40 and maintains the enumerated value of the top row in the IDS 40. Similarly, the bottom counter is updated when adding rows to the bottom of the IDS 40 and maintains the enumerated value of the bottom row in the IDS 40. Thus, the top counter and the bottom counter are used when determining the bounds of the IDS 40 (what is in the IDS 40) relative to the content of the categorized data set 300.

In general, the TM program module 37 incrementally runs through each of the counter values to build the IDS 40. The TM program module 37 essentially determines if (1) one of the objects in the original data set 38 is indexed by the counter value and (2) determines if the indexed object from the original data set should be included in the IDS 40. The TM program module 37 accomplishes this in steps 615–645.

At step 615, if the object from the original data set 38 that is indexed or enumerated by the value of the counter should be in the IDS 40, then step 615 proceeds to step 620. Otherwise, the object from the original data set 38 that is indexed by the value of the counter is not included in the IDS 38 and step 615 proceeds directly to step 635. Whether an object from the original data set should be included in the IDS 40 is discussed in more detail below with regard to FIG. 7.

At step 620, the object from the original data set 38 that is indexed or enumerated by the value of the counter is added to the IDS 40. The added object appears as a row of an outline structure of the IDS 40 contents. At step 625, any objects that are in a parent relationship with the added object from step 620 and that are not already in the IDS 40 relative to the added object are also included in the IDS 40. In other words, if a parent object (such as a summary task) is already in the IDS 40 in the same grouping as the added object, the parent object does not need to be added again to the IDS 40.

At step 630, the objects added to the IDS 40 from steps 620 and 625 are displayed on the monitor 31 in an outline structure format.

The outline structure, as illustrated below with regards to FIG. 8, is the functional arrangement of the objects showing the hierarchical relationships and the groupings according to the selected property.

At step 635, the counter is incremented to the next counter value. In the preferred embodiment, the next counter value is the next object index value within the current category index value. However, if the current object index value is the last possible value in the range of object index values, the next counter value is a combination of the first possible object index value with the next category index.

At step 640, if the next counter value has not exceeded the possible counter values (i.e., the values of the category index and the object index were not at their last possible values before step 635), then step 640 proceeds to step 645. Otherwise, the preferred method 600 terminates after step 640.

At step 645, if the size of the IDS has not exceeded the predetermined maximum size, then step 645 proceeds back to step 615 to determine if the object indexed by the next counter value should be in the IDS 40. In certain situations, the TM program module 37 may vary the predetermined maximum size as a threshold that is dynamic about a preset value. In the preferred embodiment, this occurs when the TM program module 37 indexes several parent objects in the original data set 38 that will not be included until the low-level object in a parent relationship with those parent objects is added to the IDS 40. In this manner, a kind of margin-release is implemented about the predetermined maximum size (preset value) for the last low-level or "leaf" object and each of its parent objects not already in the IDS 40 relative to the last "leaf" object. Otherwise, the preferred method 600 terminates after step 645. Thus, the IDS 40 is created in memory and maintains a portion of the categorized data set 300.

Whether an object from the original data set 38 should be included in the IDS 40 may be a complex decision. FIG. 7 is a detailed flow diagram illustrating the preferred steps for determining if an object from the original data set 38 should be included in the IDS 40 when the object is indexed by a counter value.

Referring now to FIGS. 1, 4, 5, 6, and 7, the preferred method 700 begins at step 705 where if the counter value indexes only a category, step 705 proceeds to step 707. Essentially, if the counter value indexes only a category, it does not index any of the objects within the original data set 38 and the identified object is one of the special category objects, such as the High Priority category object 500*a*. In the preferred embodiment, this occurs when the counter value has an object index value of −1. As a result, at step 707 it is determined that a category object corresponding to the counter value should be included within the IDS 40. After step 707, the preferred method 700 ends.

However, if the counter value does not index only a category, step 705 proceeds to step 710. At step 710, the original data set 38 is read to identify the object in the original data set 38 that is indexed by the object index value part of the counter value. In other words, the object index part of the counter value tells the TM program module 37 a unique ID of an object in the original data set 38 and the TM program module 37 uses this unique ID to identify the object within the original data set 38.

At step 715, if the identified object is determined to be a leaf object (i.e., the identified object is not in a parent relationship with any of the other objects from the original data set 38), then step 715 proceeds to step 720. Otherwise, step 715 proceeds directly to step 725 where it is determined that the identified object from step 710 should not be included within the IDS 40 before the preferred method 700 terminates.

At step 720, if the category of the identified object from step 710 matches the counter value (i.e., the value of the category index part of the counter value), then step 720 proceeds directly to step 730 where it is determined that the identified object from step 710 should be included within the IDS 40 before the preferred method 700 terminates. Therefore, FIGS. 6 and 7 illustrate the preferred methods used to create the IDS 40.

As discussed above, the contents of the IDS 40 are displayed on the monitor 31 in an outline structure as the IDS 40 is created in memory. Essentially, the outline structure is the functional arrangement of the objects in the IDS 40. The outline structure is function in that it shows the hierarchical relationships and the groupings of objects according to the selected property. FIG. 8 is a screen display generated by the TM program module 37 of an outline structure of the contents of an IDS 40 corresponding to the exemplary IDS 40 from FIG. 5.

Referring now to FIGS, 1, 4, 5, and 8, a window 800 is shown illustrating part of a set of categorized tasks. These categorized tasks correspond to the contents of the exemplary IDS 40 shown in FIG. 5. Essentially, different categorized tasks and property values are shown in each row 820. Each task is described in the "Task Name" column 805. The lowest-level tasks having work values listed in the "Total Work" column 810 and priority values listed in the "Priority" column 815. In this example, the tasks are categorized according to the priority value of each of the lowest-level tasks. In this manner, the categorized tasks are displayed on the monitor 31 hierarchically to represent the outline structure. The top row represents the beginning of the group of tasks having the priority value of "High" listed in the "Task Name" column 805. The top row also has a cumulative work value shown in the "Total Work" column 810 that represents a summary of all of the work values of the tasks having the "High" priority value. In other words, the value of the category in the top row is derived from the values of other rows (representing other objects). The information in the top row is stored within a special category object, as discussed earlier.

The next row lists the T1 task. The task name listing for the T1 task within the "Task Name" column 805 is indented to show the subordinate relationship of the T1 task in relation to the overall group of "High" priority tasks. The row after the T1 task is the row that lists the T11 task. The task name listing for the T11 task within the "Task Name" column 805 is indented even further to show the subordinate or child/parent relationship of the T11 task in relation to the T1 task. In summary, the indentions of hierarchically-related tasks represent the outline structure displayed on the window 800 that advantageously illustrate the parent/child relationships between the categorized tasks in a graphical manner.

Updating the Intermediate Data Structure

According to the above-described method, the IDS 40 is created as an accurate representation of a portion of the categorized data set 300 based upon the contents of the original data set 38 and a selected property. However, this ceases to be true once the contents of the original data set 38 have changed. Accordingly, the IDS 40 must be updated to reflect any changes to the original data set 38. FIG. 9 is a flow diagram illustrating the steps of the preferred method for editing an IDS 40 in response to notification of changes to the original data set 38.

Referring now to FIGS. 1, 2, 5, and 9, the preferred method 900 begins at step 905 where the TM program module 37 receives an initial signal identifying one or more objects from the original data set 38 that are scheduled to be updated.

At step 910, the values of each of objects scheduled for updating are saved in memory. At step 915, a notification signal is received indicating that certain objects in the original data set 38 have been updated.

At step 920, a first of the updated objects within the original data set 38 is identified. At step 925, if the identified object is within the IDS 40, then step 925 proceeds to step 930. This occurs when the object ID and property value of the identified object from the original data set 38 matches the object index value and the category index value for an object within the IDS 40. Basically, the IDS 40 is a series of objects in functional parent/child relationships. In the preferred embodiment, the TM program module 37 performs a recursive search within each category group (each value of category index) within the IDS 40 for objects that match the identified object from the original data set 38. Accordingly, the TM program module 37 searches down the hierarchy by interrogating each object in a category group and each subordinate child object.

As previously stated, the object index value and the category index values of the objects within the IDS 40 provide a sequential reference of objects in the categorized data set 300. The preferred TM program module 37 maintains a top counter with a value of the object index and the category index for the first object within the IDS 40. Similarly, the preferred TM program module 37 maintains a bottom counter with a value of the object index and the category index for the last object within the IDS 40. Thus, the preferred TM program module 37 is determine whether an object that would be in the categorized data set 300 appears within the IDS 40 despite the fact that the entire categorized data set 300 is never generated. Furthermore, the TM program module 37 is able to track the "relative location" of the IDS 40 (the portion of the categorized data set 300) when compared to the objects in the entire categorized data set 300, as shown in FIG. 5, despite the fact that the entire categorized data set 300 is never generated.

At step 930, the identified object from the original data set 38 has been found and appears within the IDS 40. As a result, the object within the IDS 40 representing the identified object from the original data set 38 is edited in accordance with the changes made to the identified object from the original data set 38. Thus, the edits performed in step 930 reflect the changes to the identified object in the original data set 38 before step 930 proceeds to step 950. The edits performed in step 930 are more fully described below in regards to FIG. 10.

Referring back to step 925, if the identified object is not within the IDS 40, then step 925 proceeds to step 935. At step 935, if the identified object would appear within the categorized data set 300 above the IDS 40 (i.e., above the value of the top counter based upon the value of the object ID for the identified object and the value of the property for the identified object) then step 935 proceeds directly to step 950. Otherwise, step 935 proceeds to step 945.

At step 945, if the identified object would appear within the categorized data set 300 below the IDS 40 (i.e., below the value of the bottom counter based upon the value of the object ID for the identified object and the value of the property for the identified object), it is possible that the value of one of the objects at the bottom of the IDS 40 has a "rollup" value. Objects with "rollup" values are essentially objects which have values that are derived from the values of other subordinate (child) objects. This occurs for summary type objects as opposed to the lowest-level objects. The changed value of the identified object in the original data set 38 may affect the value an object within the IDS 40 while the identified object may never appear within the IDS 40. Thus, the value of any object within the IDS 40 in a parent relationship with the identified object is modified if the value of the object in the IDS 40 is derived from the value of the identified object.

In the preferred embodiment, step 945 is accomplished by subtracting the old value of the identified object (stored upon receipt of the initial signal at step 910) from the updated value of the identified object (determined after receipt of the notification signal). This difference is added to the value of the object in the IDS 40 that is in a parent relationship with the identified object. Thus, step 945 modifies the "rollup" values for an object within the IDS 40 without having to calculate all of the values of the categorized data structure 300 and then proceeds to step 950.

At step 950, if the identified object is not the last of the updated objects from the original data set 38, then the next of the updated objects from the original data set 38 is identified at step 955 before proceeding directly back to step 925. Otherwise, the preferred method 900 terminates after step 950. Thus, the contents of the IDS 40 are changed or edited in response to notification of changes to the original data set 38.

FIG. 10 is a detailed flow diagram illustrating the preferred steps for editing objects in an IDS in response to changes in the original data set 38. Essentially, FIG. 10 illustrates the detailed steps involved when step 930 (FIG. 9) is performed.

Referring now to FIGS. 1, 4, 5, 9, and 10, the preferred method 1000 begins at step 1005 where if the updated object from the original data set 38 is only modified, step 1005 proceeds to step 1010. In other words, if the updated object has been changed or altered but is not a new object in the original data set 38 and is not an object that has been deleted from the original data set 38. This commonly occurs when the value of the updated object from the original data set 38 is changed. However, if the updated object from the original data set 38 is not merely modified (i.e., the updated object has either been inserted into the original data set 38 or deleted from the original data set 38), then step 1005 proceeds directly to step 1020.

At step 1010, the TM program module 37 updates the value of the object in the IDS 40 representing the updated object from the original data set 38. In the exemplary original data set 38, the T11 task 400b may been modified by the user to have a new value of 40 instead of its prior value of 10. In response to this modification, the value of the T11 task 400b listed within the IDS 40 would be edited to reflect this modification.

At step 1015, the rollup or summary value of any parent object in the IDS 40 that derives its value from the updated object from the original data set 38 is updated. Basically, step 1015 accounts for the existence of objects with rollup values, called summary tasks in the preferred embodiment, which are in a parent relationship with one of the lowest-level objects and which derive their "rollup" value from the value of that lowest-level object. One skilled in the art will recognize that changes to the value of the lowest-level objects can have changes to many other objects that are in such a parent relationship with the lowest-level object. Furthermore, as the IDS 40 essentially represents only a portion of the categorized data set 300, one skilled in the art will also recognize that it is possible that some of these parent objects with rollup values may not appear within the IDS 40. Thus, the TM program module 37 updates the value of the lowest-level object at step 1010 and then updates those parent objects which have rollup values derived from the value of the lowest-level object at step 1025 only if those parent objects appear within the IDS 40.

At step 1020, if the updated object from the original data set 38 has been inserted into the original data set 38, step 1020 proceeds to step 1025. In other words, step 1020 proceeds to step 1025 if the updated object is actually a new object in the original data set 38. However, if the updated object from the original data set 38 is not a new object that has been inserted into the original data set 38, then step 1020 proceeds directly to step 1035.

At step 1025, the TM program module 37 adds a new object to the IDS 40 representing the updated object (new object) in the original data set 38. In the exemplary original data set 38 from FIG. 4, if a new task was added to the original data set 38 in a subordinate or child relationship with the T1 task 400a and also has a "High" priority, the new task would be listed within the IDS 40 beneath the "High" Priority category object 500a and beneath the T1 task 400a to reflect this change.

At step 1030, parent objects of the new object in the IDS 40 are added to the IDS 40. These parent objects represent any object in the original data set 38 that (1) is in a parent relationship with the updated object (new object) in the original data set 38, (2) derives its value from the updated object (new object) from the original data set 38. Thus, the TM program module 37 adds a new object to the IDS 40 at step 1025 and then adds new parent objects associated with the added object from step 1025 at step 1030.

At step 1035, if the updated object from the original data set 38 has been deleted from the original data set 38, step 1035 proceeds to step 1040. In other words, step 1035 proceeds to step 1040 if the updated object is actually an object that has been deleted from the original data set 38. However, if the updated object from the original data set 38 is not an object that has been deleted from the original data set 38, then the preferred method 1000 terminates after step 1035.

At step 1040, the TM program module 37 removes an object from the IDS 40 representing the updated object (the deleted object) from the original data set 38. In the exemplary original data set 38 illustrated in FIG. 4, if the T22 task 400f was deleted from the original data set 38, the T22 task 400f listed within the IDS 40 beneath the "High" Priority category object 500a would be deleted to reflect this change.

At step 1045, parent and child objects associated with the deleted object in the IDS 40 are removed from the IDS 40. In the exemplary IDS 40 illustrated in FIG. 4, if the T22 task 400f was deleted from the original data set 38, the T22 task 400f listed within the IDS 40 beneath the "High" Priority category object 500a would be deleted from the IDS 40 according to step 1040 while the T2 task 400d beneath the "High" Priority category object 500a would be deleted according to step 1045. Thus, the TM program module 37 deletes an object to the IDS 40 at step 1040 and then deletes other objects associated with the deleted object from step 1040 at step 1045.

In summary, objects within the original data set are basically either modified, inserted, or deleted. Based upon these different kinds of changes to the original data set 38, the contents of the IDS must be edited to reflect the changes to the original data set 38 so as to accurately reflect a portion of the categorized data set 300.

CONCLUSION

From the foregoing description, it will be appreciated that the present invention provides a system for creating, displaying, and editing an IDS 40 that maintains a portion of a categorized data set 300 based upon an original data set 38 of hierarchically-related objects. In an embodiment of the present invention, one of the properties of the objects is selected. The TM program module 37 categorizes the data in the original data set 38 in a top-down fashion according to values of the selected property and incrementally adds the lowest-level objects to the IDS 40. With each added lowest-level object to the IDS 40, the TM program module 37 also adds any objects that are in a parent relationship with the added lowest-level object so long as those objects are not already within the category of the added lowest-level object. Special category objects, such as the "High" Priority category object 500a, are also added to the IDS 40. A category object represents a group of objects with a given value of the selected property. Objects that are added to the IDS 40 with this given value are in a parent relationship with the category object. The objects stored within the IDS 40 are displayed on the monitor in an outline structure to graphically show the parent/child relationships between the objects in each category (i.e., each group of objects with a given value of the selected property).

In another aspect of the present invention, a signal is received that identifies updated objects within the original data set 38. If the updated object appears within the IDS 40, then the value of objects in the IDS 40 representing the updated object and the value of objects in the IDS 40 that are in a parent relationship having values derived from the value of the updated object are edited. If the updated object is part of the categorized data set 300 is above the IDS 40, there is no need to modify the IDS 40. However, if the updated object is part of the categorized data set 300 is below the IDS 40, the rollup values for any parent objects of the updated objects are updated if the parent objects appear within the IDS 40.

The foregoing system may be conveniently implemented in a program module that is based upon the flow charts in FIGS. 6–7 and FIGS. 9–10. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of creating, displaying, and updating an IDS 40 in memory that maintains a portion of a categorized data set 300 based upon hierarchically-related objects within an original data set and a selected property of the objects. However, those skilled in the art will understand that the principles of the present invention apply to any tasks or processes that must efficiently manipulate or display categorized data.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented process for creating an intermediate data structure that maintains at least a portion of a categorized data set, comprising the steps of:

selecting a property of a plurality of hierarchically-related objects stored in an original data set;

generating a first sliding window portion of the categorized data set by categorizing a first portion of the hierarchically-related objects in the original data set based upon values of the selected property;

storing in memory the portion of the categorized data set to create a first intermediate data structure;

displaying the first sliding window portion on a display device;

in response to a scrolling command, generating a second sliding window portion of the categorized data set by categorizing a second portion of the hierarchially-related objects in the original data set based upon values of the selected property;

storing in memory the second sliding window portion of the categorized data set to create a second intermediate data structure; and displaying on the display device the second sliding window portion, such that each intermediate data structure substantially reduces processing time and memory resources required to manipulate the categorized data set.

2. The computer-implemented process of claim 1, wherein each intermediate data structure is a predetermined size that is smaller than the size of the categorized data set and corresponds to the size of the portion of the categorized data.

3. The computer-implemented process of claim 1, wherein one of the hierarchically-related objects appears at least two times within one of the intermediate data structures.

4. The computer-implemented process of claim 1, further comprising the step of displaying an outline structure representing the functional relationships of the hierarchically-related objects within each intermediate data structure.

5. The computer-implemented process of claim 1, wherein each step of generating each sliding window portion of the categorized data set comprises the steps of:

(a) adding a lowest of the hierarchically-related objects to the sliding window portion of the categorized data set, the added lowest object having a particular value of the selected property;

(b) adding each of the hierarchically-related objects that are in a parent relationship with the added lowest object to the sliding window portion of the categorized data set that are not already added to the sliding window portion of the categorized data set relative to the added lowest object;

(c) repeat from step (a) for each of the other lowest of the hierarchically-related objects; and (d) repeat from step (a) for each of the other values of the selected property.

6. The computer-implemented process of claim 5 further comprising the step of (c1) adding a category object for the particular value of the selected property prior to step (d).

7. The computer-implemented process of claim 1, wherein the property of the hierarchically-related objects is an attribute having at least two values, the attribute being common to the hierarchically-related objects, the value of the property being defined as the value of the attribute.

8. The computer-implemented process of claim 1, wherein the categorized data set is defined as at least two groups of the hierarchically-related objects, each of the groups associated with a value of the selected property, each of the hierarchically-related objects in each of the groups having a common value for the selected property.

9. The computer-implemented process of claim 8, wherein the categorized data set is further defined to include a category object associated with each of the groups.

10. A computer-implemented process for creating an intermediate data structure that maintains at least a portion of a categorized data set, comprising the steps of:

(a) selecting a property of a plurality of hierarchically-related objects stored in an original data set, the categorized data set being derived from each of the hierarchically-related objects and each value of the selected property;

(b) initializing a counter having a plurality of enumerated values, each of the enumerated values corresponding to a value of the selected property and one of the hierarchically-related objects in the original data set;

(c) determining if a first of the hierarchically-related objects from the original data set that corresponds to the enumerated value of the counter should be maintained in the intermediate data structure based upon the selected property;

(d) if the first object should be in the intermediate data structure, then storing the first object within the intermediate data structure;

(e) incrementing the enumerated value of the counter; and (f) repeating steps (c)–(e) until the number of objects stored within the intermediate data structure exceeds a predetermined size threshold thereby creating the intermediate data structure which represents and maintains the portion of the categorized data set.

11. The computer-implemented process of claim 10, wherein step (c) comprises determining if the first object that corresponds to the enumerated value of the counter is not in a parent relationship with any of the hierarchically-related objects having the selected property.

12. The computer-implemented process of claim 11, wherein step (d) comprises:
    if the first object is not in a parent relationship with any of the hierarchically-related objects having the selected property, then storing the first object in the intermediate data structure; and
    if a second of the hierarchically-related objects is in a parent relationship with the first object and if the second object is not already within the intermediate data structure relative to the first object, then storing the second object in the intermediate data structure.

13. The computer-implemented process of claim 10, wherein step (c) comprises determining if the enumerated value of the counter corresponds to a predetermined value; and
    wherein step (d) comprises storing a category object in the intermediate data structure if the value of the counter corresponds to the predetermined value, the category object represents a group of the hierarchically-related objects within the categorized data set defined by the selected property.

14. The computer-implemented process of claim 10, wherein the predetermined size threshold is smaller than the size of the categorized data set.

15. The computer-implemented process of claim 10, wherein the property of the hierarchically-related objects is an attribute having at least two values, the attribute being common to the hierarchically-related objects, the value of the property being defined as the value of the attribute.

16. A computer system for creating an intermediate data structure that maintains at least a portion of a categorized data set, comprising:
    a processor;
    an input device coupled to the processor;
    a pixel-based display device coupled to the processor;
    a memory storage device coupled to the processor for maintaining an original data set and the intermediate data structure derived from a plurality of hierarchically-related object maintained within the original data set; and
    the processor being operative to:
        select at least one property of the hierarchically-related objects based upon a signal received from the input device,
        initialize a counter having a plurality of enumerated values, each of the enumerated values corresponding to a value of the selected properties and an index of the hierarchically-related objects in the original data set,
        determine if a first of the hierarchically-related objects from the original data set that corresponds to the enumerated value of the counter is not in a parent relationship with any of the hierarchically-related objects having a particular value of the selected properties,
        if the first object is not in a parent relationship with any of the hierarchically-related objects having the particular value of the selected properties, then store the first object in the intermediate data structure on the memory storage device,
        if a second of the hierarchically-related objects is in a parent relationship with the first object and if the second object is not already in the intermediate data structure relative to the first object, then store the second object in the intermediate data structure on the memory storage device,
        display the contents of the intermediate data structure in an outline structure on the pixel-based display device,
        increment the enumerated value of the counter by incrementing through the indexes of the hierarchically-related objects for each of the values of the selected properties, and
        store the first object and the second object within the intermediate data structure on the memory storage device until the size of the intermediate data structure exceeds a predetermined size threshold whereby creating the intermediate data structure which represents and maintains the portion of the categorized data set.

17. The computer system of claim 16, wherein the processor is further operative, in response to storing the second object, to:
    determine if the enumerated value of the counter corresponds to a predetermined value; and
    store a category object in the intermediate data structure on the memory storage device if the enumerated value of the counter corresponds to the predetermined value, the category object representing a category within the categorized data set defined by one of the selected properties.

18. The computer system of claim 16, wherein the predetermined size threshold is smaller than the size of the categorized data set.

19. The computer system of claim 16, wherein each of the properties of the hierarchically-related objects is an attribute having at least two values, the attribute being common to the hierarchically-related objects, the value of the property being defined as the value of the attribute.

20. The computer-implemented process of claim 16, wherein the categorized data set is defined as at least two groups of the hierarchically-related objects, each of the groups associated with a value of the selected properties, each of the hierarchically-related objects in each of the groups having a common value for the selected properties.

21. A computer-implemented process for editing an intermediate data structure that maintains at least a portion of a categorized data set, comprising the steps of:
    generating a sliding window portion of the categorized data set by categorizing a portion of the hierarchically-related objects in an original data set based upon values of a selected property;
    storing in memory the sliding window portion of the categorized data set to create an immediate data structure;
    displaying the first sliding window portion on a display device;
    receiving a notification signal identifying one of a plurality of hierarchically-related objects that has been updated, the categorized data set being derived from each of the hierarchically-related objects;
    determining if the identified object appears within the intermediate data structure;

editing the intermediate data structure if the identified object appears within the intermediate data structure, wherein the edited intermediate data structure reflects updates made to the identified object in the original data set; and displaying on the display device a sliding window portion based on the edited intermediate data structure such that each intermediate data structure substantially reduces processing time and memory resources required to manipulate the categorized data set.

22. The computer-implemented process of claim 21, wherein the editing step comprises the step of updating a value of a first object in the intermediate data structure corresponding to the identified object from the original data set.

23. The computer-implemented process of claim 22 further comprising, in response to the updating step, the step of updating a value of a second object in the intermediate data structure, the second object being in a parent relationship with the first object, the value of the second object being derived from the value of the first object.

24. The computer-implemented process of claim 21, wherein the editing step comprises the step of adding a first object to the intermediate data structure corresponding to the identified object from the original data set.

25. The computer-implemented process of claim 24 further comprising, in response to the adding step, the step of adding a second object to the intermediate data structure, the second object being in a parent relationship with the first object.

26. The computer-implemented process of claim 21, wherein the editing step comprises the step of removing a first object from the intermediate data structure, the first object corresponding to the identified object from the original data set.

27. The computer-implemented process of claim 26 further comprising, in response to the removing step, the step of removing a second object from the intermediate data structure, the second object being in a parent relationship with the first object.

28. The computer-implemented process of claim 26 further comprising, in response to the removing step, the step of removing a second object from the intermediate data structure, the second object being in a child relationship with the first object.

29. The computer-implemented process of claim 21 further comprising the steps of:

determining if the one hierarchically-related object appears within the categorized data set below the portion of the categorized data set maintained within the intermediate data structure; and editing a first object within the intermediate data structure if the identified object appears within the categorized data set below the portion of the categorized data set maintained within the intermediate data structure and if a value of the first object is derived from a value of the identified object, whereby the edited first object of the intermediate data structure reflects changes made to the identified object.

30. A computer-readable medium on which is stored a computer program for editing an intermediate data structure that maintains at least a portion of a categorized data set, the computer program comprising instructions, which when executed by a computer, perform the steps of:

(a) generating a sliding window portion of the categorized data set by categorizing a first portion of the hierarchically-related objects in the original data set based upon values of the selected property;

(b) storing in memory the sliding window portion of the categorized data set to create a first immediate data structure;

(c) displaying the first sliding window portion on a display device;

(d) receiving an initial signal identifying one of a plurality of hierarchically-related objects that is to be updated, the categorized data set being derived from each of the hierarchically-related objects within the original data set;

(e) storing the value of the identified object from the original data set before the identified object from the original data set has been updated;

(f) receiving a notification signal indicating that the identified object within the original data set has been updated;

(g) determining if the identified object within the original data set appears within the intermediate data structure;

(h) if the identified object appears within the intermediate data structure, then editing a first object within the intermediate data structure, the first object corresponding to the identified object;

(i) determining if the identified object appears within the categorized data set below the portion of the categorized data set maintained within the intermediate data structure; and (j) if the identified object appears within the categorized data set below the portion of the categorized data set maintained within the intermediate data structure, then editing a second object within the intermediate data structure, a value of the second object being derived from a value of the identified object, whereby the edited first object and the edited second object within the intermediate data structure reflect updates made to the identified object within the original data set; and (k) displaying on the display device a sliding window portion based on the edited intermediate data structure such that each intermediate data structure substantially reduces processing time and memory resources required to manipulate the categorized data set.

31. The computer-readable medium of claim 30, wherein step (e) comprises the steps of, if the identified object appears within the intermediate data structure, then:

updating a value of the first object in the intermediate data structure with the value of the identified object from the original data set; and updating a value of a third object in the intermediate data structure, the third object being in a parent relationship with the first object, the value of the third object being derived from the value of the first object.

32. The computer-readable medium of claim 30, wherein step (e) comprises the steps of, if the identified object appears within the intermediate data structure, then:

adding the first object to the intermediate data structure corresponding to the one hierarchically-related object from the original data set; and adding a third object in the intermediate data structure, the third object being in a parent relationship with the first object.

33. The computer-readable medium of claim 30, wherein step (e) comprises the steps of, if the identified object appears within the intermediate data structure, then:

removing the first object from the intermediate data structure corresponding to the one hierarchically-related object from the original data set; and removing a third object from the intermediate data structure, the third object being in a parent relationship with the first object.

34. The computer-readable medium of claim 30, wherein step (e) comprises the steps of, if the identified object appears within the intermediate data structure, then:
   removing the first object from the intermediate data structure corresponding to the one hierarchically-related object from the original data set; and
   removing a third object from the intermediate data structure, the third object being in a child relationship with the first object.

35. A computer-implemented process for creating an intermediate data structure that maintains at least a portion of a categorized set of tasks, comprising the steps of:
   (a) selecting a property of a plurality of tasks, each of the tasks being hierarchically-related to each other, the tasks being maintained within an original set of tasks, the categorized set of tasks being derived from each of the tasks and each of the values of the selected property;
   (b) initializing a counter having a plurality of enumerated values, each of the enumerated values corresponding to a value of the selected property and one of the tasks in the original set of tasks;
   (c) determining if a first of the tasks that corresponds to the enumerated value of the counter should be maintained in the intermediate data structure based upon the selected property;
   (d) if the first task should be in the intermediate data structure, then storing the first task within the intermediate data structure;
   (e) incrementing the enumerated value of the counter; and
   (f) repeating steps (c)–(e) until the number of tasks stored within the intermediate data structure exceeds a predetermined threshold whereby creating the intermediate data structure which represents and maintains the portion of the categorized set of tasks.

36. The computer-implemented process of claim 35, wherein step (c) comprises determining if the first task that corresponds to the enumerated value of the counter is hierarchically a lowest of the tasks having the selected property.

37. The computer-implemented process of claim 36, wherein step (d) comprises:
   if the first task is hierarchically the lowest of the tasks having the selected property, then storing the first task in the intermediate data structure; and
   if the first task is subordinate to a second of the tasks and if the second task is not already within the intermediate data structure relative to the first task, then storing the second task in the intermediate data structure.

38. The computer-implemented process of claim 35, wherein step (c) comprises determining if the enumerated value of the counter corresponds to a predetermined value; and
   wherein step (d) comprises storing a category object in the intermediate data structure if the value of the counter corresponds to the predetermined value, the category object representing a group of the tasks within the portion of the categorized data set defined by the selected property.

* * * * *